(No Model.) 3 Sheets—Sheet 1.

W. D. MURRAY.
CORN HARVESTER.

No. 321,908. Patented July 7, 1885.

Witnesses.
Louis F. Gardner
A. S. Pattison

Inventor:
W. D. Murray,
per
J. A. Lehmann, atty (No Model.)
W. D. MURRAY.
CORN HARVESTER.
No. 321,908.    Patented July 7, 1885.
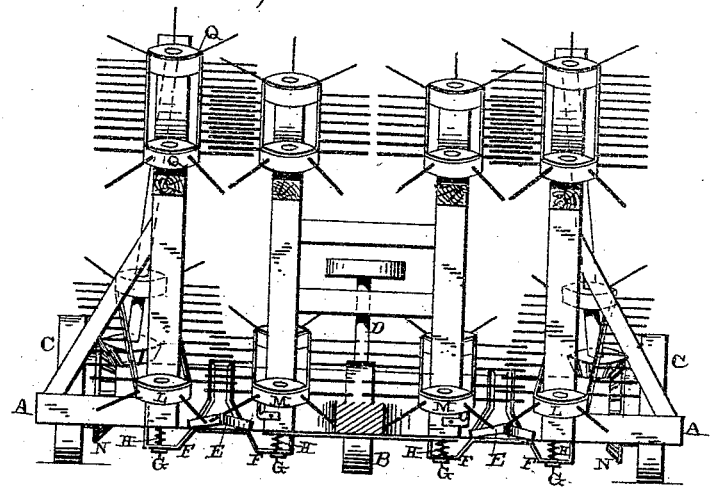
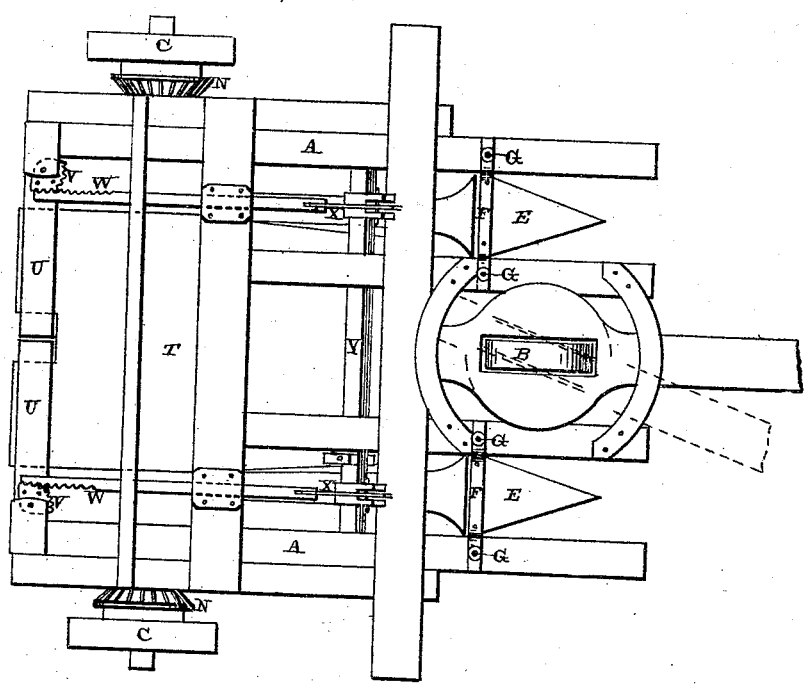
Witnesses.
Louis J. Gardner
A. S. Pattison
Inventor.
W. D. Murray
per
J. A. Lehmann, Att'y (No Model.)
W. D. MURRAY.
CORN HARVESTER.
No. 321,908. Patented July 7, 1885.
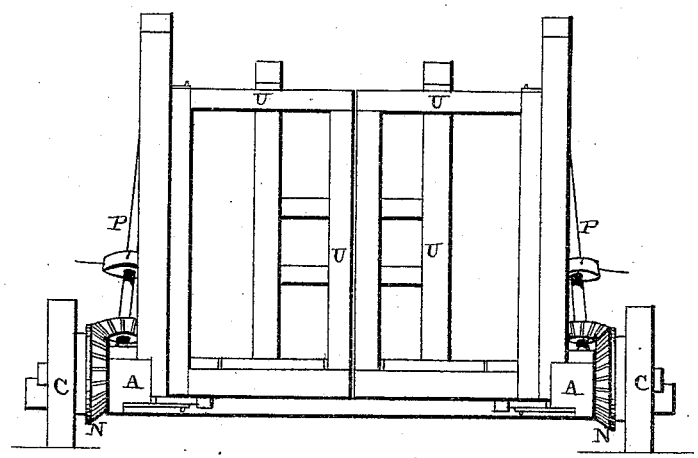

UNITED STATES PATENT OFFICE.

WILLIAM D. MURRAY, OF HAMILTON, MISSOURI.

CORN-HARVESTER.

SPECIFICATION forming part of Letters Patent No. 321,908, dated July 7, 1885.

Application filed May 13, 1884. (No model.)

*To all whom it may concern:*

Be it known that I, WILLIAM D. MURRAY, of Hamilton, in the county of Caldwell and State of Missouri, have invented certain new and useful Improvements in Corn-Harvesters; and I do hereby declare the following to be a full, clear, and exact description of the invention, such as will enable others skilled in the art to which it pertains to make and use it, reference being had to the accompanying drawings, which form a part of this specification.

My invention relates to an improvement in corn-harvesters; and it consists, first, in the combination of a single cutting-knife, having its edges turned upward, and which knife is secured to a bearing which is vertically adjustable, and which knife and bearing are returned to their places by means of coiled springs when left free to move; second, the combination of the tilting platform, the gates which hold the stalks in position, and a mechanism for opening the gates, so that the weight of the shock will tilt the platform and drop the shock upon the ground; third, in the combination and arrangement of parts, which will be more fully described hereinafter.

Figure 1:
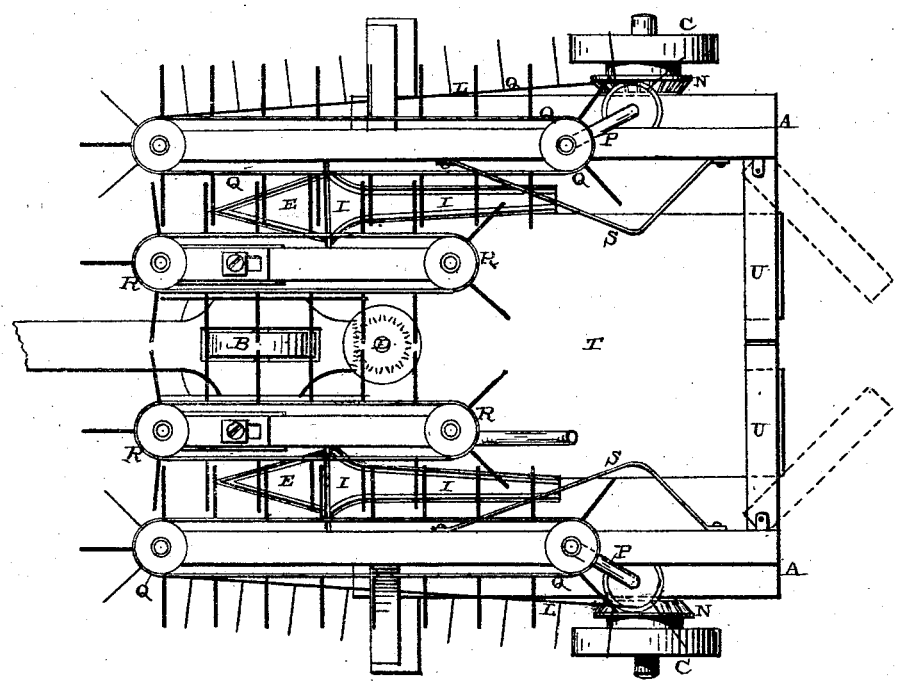
Figure 2:
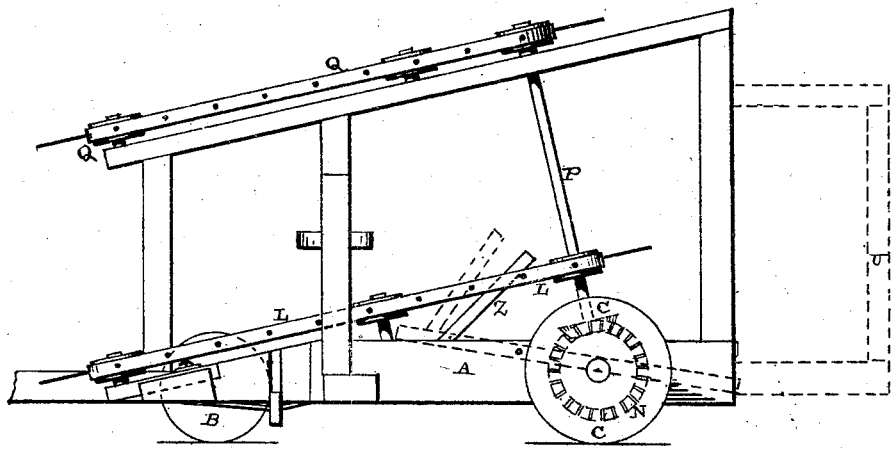

Figure 1 is a plan view of a machine embodying my invention. Fig. 2 is a side elevation of the same. Fig. 3 is a front view. Fig. 4 is an inverted view. Fig. 5 is a rear view. Fig. 6 is a vertical cross-section of one of the knives.

A represents a suitable frame-work, which is supported in front by the guiding-wheel B, and at the rear by the two wheels C. The guiding-wheel B is placed in a suitable revolving frame, which has teeth upon its rear end, for the purpose of engaging with the pinion upon the lower end of the shaft D.

The operator, standing upon this machine, by simply turning the shaft D by means of the wheel upon its top, can guide the machine with perfect ease, so as to have the cutters come just opposite the two rows of growing stalks.

Placed upon each side of the guiding-wheel B is the triangular-shaped knife E, which is secured at its rear end to the cross-bar F, which cross-bar is supported in position upon the rods G in such a manner that the cross-bar carrying the knife with it has a suitable amount of vertical movement or play. Upon these rods G, above the tops of the cross-bars, are suitable coiled springs H, for the purpose of returning the cross-bar and knife to position when they are left free to move. Upon the two outer sides of this knife the edges are turned upward at an angle of about fifteen degrees, so as to give a drawing upward cut. The spring allows the knife to yield to the action of the cut, and return the knife to position after passing the stub for the next cut. As the machine is drawn forward the stalks are crowded in between the sides of the frame and the edges of the knife, and the forward movement of the knife against these stalks causes them to be cut. Just back of each knife is placed the tapering trough or guide-way I, in which the lower ends of the stalks are caught and held while they are being moved backward by the endless belts. Extending along over the top of each knife, and for a suitable distance in advance of its front end, are the two belts L M, the one M being shorter and driven or operated only by the backward movement of the stalks. The one L is much longer than the one M, and is operated by means of the large gear-wheel N, which is secured to the driving-wheel C. Upon the lower end of the shaft P, which is inclined forward, is placed a bevel-gear which meshes with the bevel-gear on the wheel, and also a pulley around which the belt L passes. The front end of the belt L is passed around a pulley which has its bearing secured to a slide, by means of which the pulley can be adjusted back and forth to tighten or loosen the belt at any time. This belt, being positively operated by the forward movement of the machine, catches the stalks in advance of the cutter and forces them back against the knife or cutter, as already described. The belt M, which, like the belt N, is also provided with metallic rods, arms, or projections, is made to move along with the stalks. Upon the upper end of the inclined shaft is placed a second pulley, which drives another long belt, Q, and just opposite this long belt Q is a second short belt, R. The belts catch the upper ends of the stalks and hold them in a vertical position while they are being moved backward.

Secured to the frame-work are suitable metallic rods or guides, S, which project outward near the rear ends of these belts on their inner sides, and which rods not only serve to disengage the stalks from the arms or teeth of the belts, but at the same time help to keep the stalks in an upright position as they are being moved upon the platform. The arms, rods, or spikes which project from the belts are made long enough to cross each other, and thus the stalks, after being once caught between the belts, are kept moving continuously backward as long as the machine is in motion, and as the stalks are prevented from falling at any time they are delivered in a vertical position upon the platform ready to be bound into a shock by the operator. The platform T, which is pivoted in front of its center, is supported near its rear end, when closed by the gates or doors U; but when the doors or gates are opened will tilt downward from the weight of the shock placed upon it and drop it upon the ground. In order to keep the gates or doors closed until it is desired that they shall be opened for the purpose of dropping the shock, each one is provided with a toothed segment, V, which meshes with a rack-bar, W. These rack-bars are connected at their front ends by means of the coupling-rods X with the arms on the rocking shaft Y. This shaft is operated by means of the lever Z, which projects up above the platform where the operator is standing. When it is desired to open the gates, the operator has but to move this lever, when the rack-bars are forced outward, and their motion thereby throws the gates wide open, when the platform, being no longer supported, the shock causes it to tilt backward. The stalks are delivered in a vertical position upon this platform, so that the operator can bind them into shocks. When it is desired to bind the shock and deposit it upon the ground, the forward movement of the machine is stopped for this purpose.

Having thus described my invention, I claim—

1. In a stalk-cutter, a cutting-knife having its edges turned upward at an angle, substantially as shown.

2. The combination of a single knife or cutter, a supporting cross-bar, guiding-rods upon which the cross-bar rises and falls, and springs for returning the cross-bar and knife to position, substantially as described.

3. In a corn-harvester, the combination of the tilting platform, the two doors which act as supports for its rear end, the operating-lever connected to the shaft Y, the sliding rack-bars W, and the segments V, connected to the doors, and operated by the rack-bars, substantially as set forth.

In testimony whereof I affix my signature in presence of two witnesses.

WILLIAM D. MURRAY.

Witnesses:
H. K. McCoy,
C. C. McCoy.